US011300961B2

(12) United States Patent
Kizumi

(10) Patent No.: US 11,300,961 B2
(45) Date of Patent: Apr. 12, 2022

(54) VEHICLE CONTROL APPARATUS AND METHOD FOR CONTROLLING AUTOMATED DRIVING VEHICLE

(71) Applicant: HONDA MOTOR CO., LTD., Tokyo (JP)

(72) Inventor: Yuki Kizumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 285 days.

(21) Appl. No.: 16/685,020

(22) Filed: Nov. 15, 2019

(65) Prior Publication Data
US 2020/0081441 A1 Mar. 12, 2020

Related U.S. Application Data

(63) Continuation of application No. PCT/JP2017/020693, filed on Jun. 2, 2017.

(51) Int. Cl.
G05D 1/02 (2020.01)
G05D 1/00 (2006.01)
(Continued)

(52) U.S. Cl.
CPC ......... G05D 1/0212 (2013.01); G05D 1/0088 (2013.01); B60T 7/12 (2013.01);
(Continued)

(58) Field of Classification Search
CPC .... B60W 60/001; B60T 2220/04; B60T 7/12; G08G 1/166; G05D 1/0088; G05D 1/0212;
(Continued)

(56) References Cited

U.S. PATENT DOCUMENTS 6,151,539 A * 11/2000 Bergholz .............. G01S 17/931
701/25
7,233,861 B2 6/2007 Van Buer et al.
(Continued)

FOREIGN PATENT DOCUMENTS

CN 102598083 A 7/2012
CN 103646561 A 3/2014
(Continued)

OTHER PUBLICATIONS

Kuderer, Markus; Gulati, Shilpa; Burgard, Wolfram, Learning Driving Styles for Autonomous Vehicles from Demonstration, May 2015, 2015 IEEE International Conference on Robotics and Automation (ICRA) (Year: 2015).*
(Continued)

Primary Examiner — Behrang Badii
Assistant Examiner — Matthew J. Reda
(74) Attorney, Agent, or Firm — Thomas | Horstemeyer, LLP

(57) ABSTRACT

A vehicle control apparatus configured to control automated driving of a vehicle acquires information relating to a situation in a surrounding area of the vehicle, acquires, for each of a plurality of positions, a first value relating to a probability that an object that is present in the surrounding area will be present at a future point in time and a second value obtained based on travel data of a predetermined driver based on the information, and determines a path on which the vehicle is to move, by selecting positions at which the vehicle is to be present at a plurality of future points in time from the plurality of positions based on combinations of the first values and the second values.

10 Claims, 6 Drawing Sheets

(51) Int. Cl.
*B60T 7/12* (2006.01)
*B62D 5/04* (2006.01)
*B62D 6/00* (2006.01)
*B62D 15/02* (2006.01)

(52) U.S. Cl.
CPC ......... *B60T 2220/04* (2013.01); *B62D 5/0463* (2013.01); *B62D 6/00* (2013.01); *B62D 15/0265* (2013.01); *G05D 2201/0213* (2013.01)

(58) Field of Classification Search
CPC .......... G05D 2201/0213; B62D 15/025; B62D 15/0265; B62D 5/0463; B62D 6/00
See application file for complete search history.

(56) References Cited

U.S. PATENT DOCUMENTS

| | | | |
|---|---|---|---|
| 7,487,074 | B2 | 2/2009 | Ohtsu et al. |
| 7,860,813 | B2 | 12/2010 | Wang et al. |
| 8,947,218 | B2 | 2/2015 | Yoshizawa et al. |
| 9,224,299 | B2 | 12/2015 | Taguchi et al. |
| 9,463,797 | B2 | 10/2016 | Damerow et al. |
| 9,493,158 | B2 | 11/2016 | Harvey |
| 9,767,696 | B2 | 9/2017 | Arndt et al. |
| 9,878,710 | B2 | 1/2018 | Schmuedderich et al. |
| 10,286,900 | B2 | 5/2019 | Xi et al. |
| 10,336,322 | B2 | 7/2019 | Harvey |
| 10,414,394 | B2 | 9/2019 | Ohmura |
| 10,431,094 | B2 | 10/2019 | Noda et al. |
| 10,559,205 | B2 | 2/2020 | Minemura et al. |
| 11,049,398 | B2 | 6/2021 | Horita et al. |
| 2004/0176936 | A1 | 9/2004 | Ohtsu et al. |
| 2005/0125148 | A1 | 6/2005 | Van Buer et al. |
| 2009/0191513 | A1 | 7/2009 | Wang et al. |
| 2010/0010699 | A1 | 1/2010 | Taguchi et al. |
| 2012/0218093 | A1* | 8/2012 | Yoshizawa ............. G08G 1/163 340/435 |
| 2014/0012469 | A1 | 1/2014 | Kunihiro et al. |
| 2015/0012167 | A1 | 1/2015 | Wolter |
| 2015/0269844 | A1 | 9/2015 | Arndt et al. |
| 2015/0344030 | A1 | 12/2015 | Damerow et al. |
| 2016/0096525 | A1 | 4/2016 | Harvey |
| 2016/0325743 | A1 | 11/2016 | Schmuedderich et al. |
| 2017/0031361 | A1* | 2/2017 | Olson ............... B60W 30/0953 |
| 2017/0050637 | A1 | 2/2017 | Harvey |
| 2017/0297564 | A1 | 10/2017 | Xi et al. |
| 2018/0114442 | A1 | 4/2018 | Minemura et al. |
| 2018/0345957 | A1 | 12/2018 | Ohmura |
| 2019/0145788 | A1 | 5/2019 | Fischer et al. |
| 2019/0213886 | A1 | 7/2019 | Noda et al. |
| 2019/0227561 | A1 | 7/2019 | Hiramatsu |
| 2019/0276015 | A1 | 9/2019 | Harvey |
| 2019/0333386 | A1 | 10/2019 | Horita et al. |
| 2020/0143670 | A1 | 5/2020 | Kitani et al. |

FOREIGN PATENT DOCUMENTS

| | | |
|---|---|---|
| CN | 104260725 A | 1/2015 |
| CN | 104590274 A | 5/2015 |
| CN | 104925055 A | 9/2015 |
| CN | 105574537 A | 5/2016 |
| CN | 105808314 A | 7/2016 |
| CN | 105892471 A | 8/2016 |
| JP | H11-337643 A | 12/1999 |
| JP | 2006-154967 A | 6/2006 |
| JP | 2009-176288 A | 8/2009 |
| JP | 2015-228204 A | 12/2015 |
| JP | 2016-212872 A | 12/2016 |
| WO | 2018/220851 A1 | 12/2018 |
| WO | 2018/220853 A1 | 12/2018 |

OTHER PUBLICATIONS

International Search Report for PCT/JP2017/020693 dated Aug. 22, 2017 (partially translated).
International Search Report for PCT/JP2017/020698 dated Aug. 15, 2017 (partially translated).
U.S. Office Action for U.S. Appl. No. 16/685,024 dated Aug. 19, 2021.
Chinese Office Action for Chinese Patent Application No. 201780091031.4 dated Jul. 22, 2021 (partially translated).

* cited by examiner

VEHICLE CONTROL APPARATUS AND METHOD FOR CONTROLLING AUTOMATED DRIVING VEHICLE

CROSS-REFERENCE TO RELATED APPLICATION

This application is a continuation of International Patent Application No. PCT/JP2017/020693 filed on Jun. 2, 2017, the entire disclosures of which is incorporated herein by reference.

BACKGROUND OF THE INVENTION

Field of the Invention

The present invention is related to a vehicle control apparatus and a method for controlling an automated driving vehicle.

Description of the Related Art

Automated driving of a vehicle is realized using steering control in which a surrounding environment of the vehicle is recognized, a path for the vehicle to follow is determined based on the recognition result, and the vehicle is caused to actually travel along the path. Here, when the path is being determined, positions of moving objects and still objects on or around the road are specified, predicted positions at one or more future points in time of the moving objects are estimated, and the positions at which the vehicle is to be present at those future points in time are determined based on the specification and estimation results. For example, the positions at which the vehicle is to be present are determined such that the vehicle is present in regions in which the objects are not present at the points in time.

In the determination of the path as described above, if there are many moving objects, for example, the predicted positions of the objects at a certain point in time are distributed in a wide range, and as a result, there are no longer any positions at which the vehicle can be present at that point in time, and the path cannot be established.

SUMMARY OF THE INVENTION

The present invention solves at least this problem, and aims to enable determination of a suitable path according to a situation, in an automated driving vehicle.

A vehicle control apparatus according to an aspect of the present invention is a vehicle control apparatus configured to control automated driving of a vehicle, wherein the vehicle control apparatus is configured to: acquire information relating to a situation in a surrounding area of the vehicle, acquire, for each of a plurality of positions, a first value relating to a probability that an object that is present in the surrounding area will be present at a future point in time and a second value obtained based on travel data of a predetermined driver based on the information, wherein the first value is a value that is higher the higher the probability that an object that is present in the surrounding area will be present is, and wherein the second value is a value that is higher the higher the probability that the vehicle would be moved to each of the plurality of positions if a predetermined driver was in the situation is, and determine a path on which the vehicle is to move, by selecting positions at which the vehicle is to be present at a plurality of future points in time from the plurality of positions based on combinations of the first values and the second values, by selecting, from the plurality of positions, positions at which a value obtained by subtracting the second value from the first value reaches a minimum or is less than or equal to a predetermined threshold value.

Further features of the present invention will become apparent from the following description of exemplary embodiments (with reference to the attached drawings).

BRIEF DESCRIPTION OF THE DRAWINGS

The attached drawings are included in and constitute a part of the specification, illustrate embodiments of the present invention, and are used together with the description thereof to explain the principle of the present invention.

DESCRIPTION OF THE EMBODIMENTS

Hereinafter, an embodiment of the present invention will be described with reference to the drawings.

Configuration of Vehicle Control Apparatus

Figure 1:
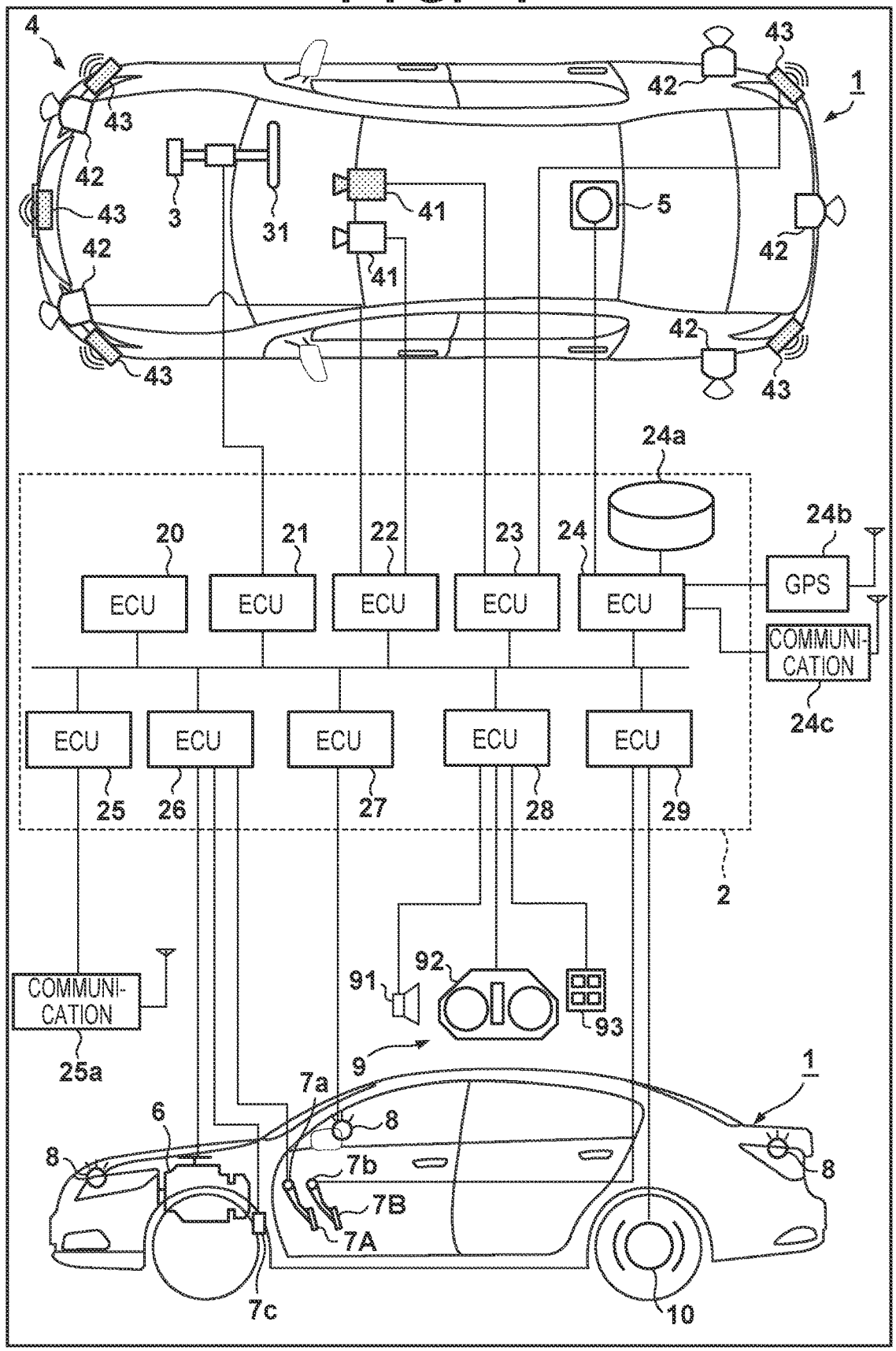
FIG. 1 is a block diagram of a vehicle control apparatus.

FIG. 1 shows a block diagram of a vehicle control apparatus according to the present embodiment, for controlling a vehicle 1. FIG. 1 shows overviews of the vehicle 1 in a plan view and a side view. The vehicle 1 is a sedan-type four-wheel passenger vehicle, in one example.

A control apparatus shown in FIG. 1 includes a control unit 2. The control unit 2 includes multiple ECUs 20 to 29 that are connected through an in-vehicle network so as to be able to communicate. The ECUs (Electronic Control Units) each include: a processor represented by a CPU (Central Processing Unit), a storage device such as a semiconductor memory, an interface with an external device, and the like. The storage device stores programs to be executed by the processor, data to be used by the processor for processing, and the like. Each ECU may also include multiple storage devices, interfaces, and the like.

Hereinafter, functions and the like handled by the ECUs 20 to 29 will be described. Note that the number and functions of the ECUs can be designed as appropriate for the vehicle 1, and more ECUs can be used or some ECUs can be integrated.

The ECU 20 executes control relating to the automated driving of the vehicle 1. In the automated driving, at least one of the steering and the acceleration of the vehicle 1 is automatically controlled.

The ECU 21 controls an electric power steering apparatus 3. The electric power steering apparatus 3 includes a mechanism for steering the front wheels according to a driving operation (steering operation) performed by a driver on a steering wheel 31. Also, the electric power steering apparatus 3 includes a motor that exerts a driving force for assisting the steering operation or automatically steering the front wheels, a sensor for sensing a steering angle, and the like. If the driving state of the vehicle 1 is automated driving, the ECU 21 automatically controls the electric power steering apparatus 3 in correspondence with instructions from the ECU 20 and controls the travel direction of the vehicle 1.

The ECUs 22 and 23 control detection units 41 to 43 for detecting a situation in the surrounding area of the vehicle, and perform information processing on the detection results. The detection units 41 are cameras for shooting a region in front of the vehicle 1 (hereinafter referred to as "cameras 41" in some cases), and two detection units 41 are provided on the front portion of the roof of the vehicle 1, in the case of the present embodiment. Through analysis of an image shot by the camera 41, it is possible to extract outlines of objects and extract division lines (white lines, etc.) of lanes on the road.

The detection units 42 are lidars (laser radars) (hereinafter referred to as "lidars 42" in some cases), and the detection units 42 detect objects in the surrounding area of the vehicle 1 and measure distances to the objects. In the case of the present embodiment, five lidars 42 are provided: one at each corner portion of the front portion of the vehicle 1, one in the center of the rear portion, and one on each side of the rear portion. The detection units 43 are millimeter-wave radars (hereinafter referred to as radars 43 in some cases), and the detection units 43 detect objects in the surrounding area of the vehicle 1 and measure distances to the objects. In the case of the present embodiment, five radars 43 are provided: one in the center of the front portion of the vehicle 1, one at each corner portion on the front portion, and one on each corner portion of the rear portion.

The ECU 22 performs control of one of the cameras 41, and of the lidars 42, and performs information processing of the detection results. The ECU 23 performs control of the other camera 41 and of the radars 43, and performs information processing of the detection results. The reliability of the detection results can be improved by including two sets of apparatuses for detecting a situation in the surrounding area of the vehicle, and multi-faceted analysis of the surrounding environment of the vehicle can be performed by including different types of detection units, such as cameras, lidars, and radars.

The ECU 24 controls a gyrosensor 5, a GPS sensor 24b, and a communication apparatus 24c and performs information processing of detection results or communication results. The gyrosensor 5 detects a turning movement of the vehicle 1. The path of the vehicle 1 can be determined using the detection result of the gyrosensor 5, wheel speeds, and the like. The GPS sensor 24b detects the current position of the vehicle 1. The communication apparatus 24c performs wireless communication with a server that provides map information and traffic information, and the communication apparatus 24c acquires the map information and the traffic information. The ECU 24 can access a database 24a of map information constructed in a storage device, and the ECU 24 performs a search for a route from the current location to a destination, and the like.

The ECU 25 includes a communication apparatus 25a for inter-vehicle communication. The communication apparatus 25a performs wireless communication with other vehicles in the surrounding area, and performs information exchange with the vehicles.

The ECU 26 controls a power plant 6. The power plant 6 is a mechanism that outputs a driving force for rotating driving wheels of the vehicle 1, and for example, includes an engine and a transmission. For example, the ECU 26 controls the output of the engine in correspondence with a driving operation (an accelerator operation or an acceleration operation) that was performed by the driver and detected by an operation detection sensor 7a provided in an acceleration pedal 7A, or the ECU 26 switches the gear ratio of the transmission based on information such as the vehicle speed detected by a vehicle speed sensor 7c. If the driving state of the vehicle 1 is automated driving, the ECU 26 automatically controls the power plant 6 in correspondence with instructions from the ECU 20 and controls the acceleration of the vehicle 1.

The ECU 27 controls lighting devices (head lights, tail lights, etc.) including direction instruction devices 8. In the case of the example shown in FIG. 1, the direction instruction devices 8 are provided on the front portion, the door mirrors, and the rear portion of the vehicle 1.

The ECU 28 controls an input-output apparatus 9. The input-output apparatus 9 performs output of information to the driver and receives input of information from the driver. An audio output apparatus 91 reports information to the driver using audio. A display apparatus 92 reports information to the driver through display of an image. The display apparatus 92 is arranged on the driver's seat surface, for example, and includes an instrument panel and the like. Note that although audio and display are indicated as examples herein, information may also be reported through vibration or light. Also, information may be reported through a combination of any of audio, display, vibration, and light. Furthermore, the combination may be changed or the reporting mode may be changed according to the level (e.g., degree of urgency) of the information to be reported.

An input apparatus 93 is arranged at a position at which it can be operated by the driver, and is a group of switches for performing instruction to the vehicle 1, but an audio input apparatus may also be included therein.

The ECU 29 controls brake apparatuses 10 and a parking brake (not shown). The brake apparatuses 10 are, for example, disk brake apparatuses, are provided in the wheels of the vehicle 1, and decelerate or stop the vehicle 1 by adding resistance to the rotation of the wheels. For example, the ECU 29 controls the operation of the brake apparatuses 10 in correspondence with a driving operation (brake operation) that was performed by the driver and detected by the operation detection sensor 7b provided in the brake pedal 7B. If the driving state of the vehicle 1 is automated driving, the ECU 29 automatically controls the brake apparatuses 10 in correspondence with instructions from the ECU 20 and controls deceleration and stopping of the vehicle 1. The brake apparatuses 10 and the parking brake can also operate in order to maintain the stopped state of the vehicle 1. Also, if the transmission of the power plant 6 includes a parking lock mechanism, the parking lock mechanism can also operate in order to maintain the stopped state of the vehicle 1.

Overview of Processing

In the present embodiment, the ECU 20 executes control relating to automated driving of the vehicle 1. When a destination and automated driving are instructed by the driver, the ECU 20 automatically controls the travel of the vehicle 1 toward the destination in accordance with a guiding route searched for by the ECU 24. During automated driving, the ECU 20 acquires information relating to a situation in the surrounding area of the vehicle 1 from the ECUs 22 and 23, and specifies a path on which the vehicle 1 is to travel in a short period (e.g., 5 seconds) based on the acquired information. The path is specified by determining the position of the vehicle 1 in increments of a predetermined amount of time (e.g., 0.1 seconds). For example, if a path for five seconds is specified in increments of 0.1 seconds, the positions of the vehicle 1 at 50 points in time from 0.1 seconds later to 5.0 seconds later are determined, and a path obtained by connecting those fifty positions is determined as the path on which the vehicle 1 is to travel. Note that "a short period" in this context is a period that is significantly shorter compared to the overall travel of the vehicle 1, and for example, is determined based on the range in which the detection units can detect the surrounding environment, the amount of time needed to brake the vehicle 1, and the like. Also, "a predetermined amount of time" is set to a length according to which the vehicle 1 can adapt to changes in the surrounding environment. The ECU 20 controls the steering, driving, and braking of the vehicle 1 by instructing the ECUs 21, 26, and 29 in accordance with the path specified in this manner.

Figure 2:
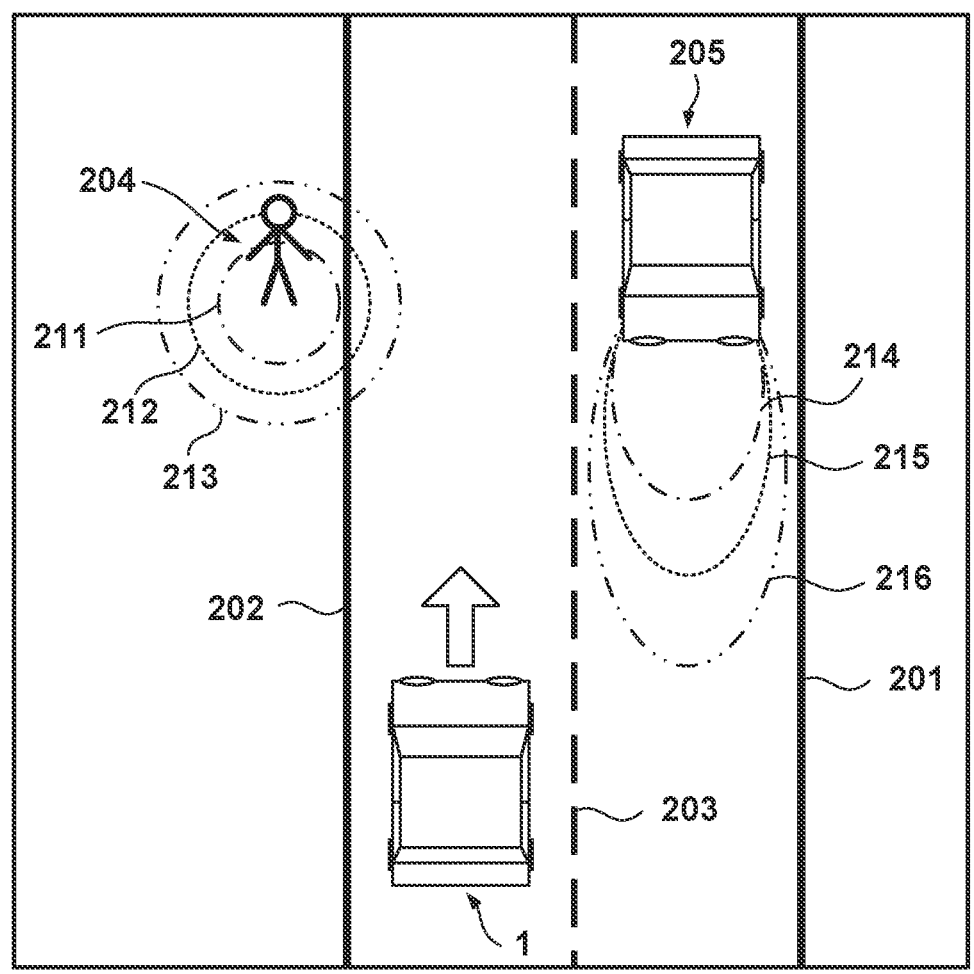
FIG. 2 is a diagram showing an example of ranges in which it is envisioned that moving objects will be present.

Here, specification of the path for a short period of the vehicle 1, which is executed by the ECU 20, will be described. FIG. 2 is a diagram showing a state on and around a road on which the vehicle 1 is traveling at a certain instant, and ranges in which objects are predicted to be present in the future, the ranges being used to predict future states. The vehicle 1 travels (from the lower side to the upper side in FIG. 2) in a left lane divided by a center line 203 in a range in which vehicles can travel, which is indicated by lines 201 and 202 (e.g., lines corresponding to a roadway edge marking, a road shoulder zone, a guard rail, a curbstone, etc.). A pedestrian 204 and another vehicle 205 are present in the travel direction of the vehicle 1. Note that FIG. 2 shows only one other vehicle and one pedestrian for the sake of simplicity, but for example, other traffic participants such as bicycles and two-wheeled vehicles, and non-traffic participants such as obstructions can be present on or around the road. It can also be envisioned that two or more other vehicles and two or more pedestrians are present.

In FIG. 2, the ranges in which it is envisioned that the pedestrian 204 will be present in the future are indicated by a one-dot chain line 211, a dotted line 212, and a two-dot chain line 213, which surround the pedestrian 204. Here, the range of the dotted line 212 is a range in which it is envisioned that the pedestrian 204 will be present at a time after that of the range of the one-dot chain line 211, and similarly, the range of the two-dot chain line 213 is a range in which it is envisioned that the pedestrian 204 will be present at a time after that of the range of the dotted line 212. Note that the probability that the pedestrian 204 will be present in each range can be determined according to a two-dimensional normal distribution centered about the center of a circle, for example. Note that in a situation in which it is difficult for a pedestrian to move toward the road, such as a case in which a guard rail is located near the dividing line 202, for example, the range in which it is envisioned that the pedestrian will be present in the future is not a perfect circle. For example, only the leftward portion or a shape similar thereto, which is obtained by the ranges shown in FIG. 2 being cut off by the line 202, will be the range in which it is envisioned that the pedestrian 204 will be present in the future. Also, since it is envisioned that the pedestrian 204 will move in the direction he or she is facing, according to the direction of the face of the pedestrian 204, the range in which it is envisioned that the pedestrian 204 will be present in the future can be an elliptical shape that is significantly larger in the direction that the pedestrian 204 is facing. Note that the method for estimating the range in which the pedestrian 204 will be present in the future is not limited to this method, and the presence range and presence probability can be estimated using any other method. Also, in all cases, not only is the range determined, but scores corresponding to the probabilities of the pedestrian 204 being present at positions in the range are added, and a first distribution is acquired which indicates that the higher the score is, the higher the probability that the pedestrian 204 will be present at that position is. Note that the ranges need not be explicitly obtained, and it is also possible to only acquire the first distribution.

Similarly, a first distribution for ranges in which it is envisioned that the other vehicle 205 will be present in the future (the ranges indicated by a one-dot chain line 214, a dotted line 215, and a two-dot chain line 216) can also be acquired. Here, the range of the dotted line 215 is a range in which it is envisioned that the other vehicle 205 will be present at a time after that of the range of the one-dot chain line 214, and similarly, the range of the two-dot chain line 216 is a range in which it is envisioned that the other vehicle 205 will be present at a time after that of the range of the dotted line 215. In this manner, upon acquiring the information relating to the situation in the surrounding area of the vehicle 1 from the ECUs 22 and 23, the ECU 20 acquires the first distributions corresponding to the probabilities of the locations at which the moving objects will be present in the future, by executing predetermined processing, for example, based on the acquired information.

A still object does not move and therefore has no variation over time, but since it is envisioned that the object also will not disappear, a first distribution is specified in which the position at which the object is present is the same at each point in time. For example, if a guard rail or a curbstone is arranged along the line 202, a first distribution in which the range in which object is present has a form extending along the line 202 is specified as the first distribution for the guard rail or the curbstone. The ECU 20 acquires a value obtained by adding together the first distributions of the objects at each position as a total first distribution.

In one example, the ECU 20 specifies the regions in which the objects will not be present at each point in time and determines the path such that the vehicle 1 travels through those positions. Doing this makes it possible to select a path such that the vehicle 1 does not interfere with the objects. Note that for a still object such as a guard rail or a curbstone, for example, a range relating to a first distribution may also be determined so as to include a range that is a certain distance away from the actual position of the still object toward the road. Accordingly, it is possible to prevent the vehicle 1 from approaching the still object more than is necessary and thus to prevent a person riding in the vehicle 1 from feeling nervous. On the other hand, with a procedure in which the path of the vehicle 1 is determined in this manner based on the regions in which objects are not present, there is a possibility that in an environment in which many pedestrians are present, for example, there will be no region in which the objects will not be present after a predetermined amount of time, or the region will not be sufficient for arranging the vehicle 1. In this case, the ECU 20 cannot determine the route path after a predetermined amount of time, and as a result, the vehicle 1 may stop, and automated driving will not be possible, depending on the case.

In contrast to this, in the present embodiment, the ECU 20 determines the path of the vehicle 1 with further consideration given to data that is a combination of traveling performed by a predetermined driver, for example, in various circumstances, and the situation in the surrounding area of the vehicle 1 detected at this time. For example, the predetermined driver can be an accident-free driver, a taxi driver, a certified driving expert, or the like. For example, the ECU 20 acquires a second distribution relating to how a predetermined driver would travel in a similar situation, or indicating the positions to which the vehicle 1 would be moved if the driver were a predetermined driver. The second distribution is a distribution in which positions to which the predetermined driver is more likely to move the vehicle 1 in the situation of the vehicle 1 have higher values, and positions to which the predetermined driver is less likely to move the vehicle 1 have lower values. Note that the "predetermined driver" in this context can be a professional driver, an excellent driver, or the like, for example. Also, travel data may be collected from many vehicles, and travel data that satisfies a predetermined condition, such as sudden starts, sudden braking, and abrupt steering not being performed, or travel speed being stable, may be extracted from the collected travel data, and may be treated as travel data of a predetermined driver.

Figure 3:
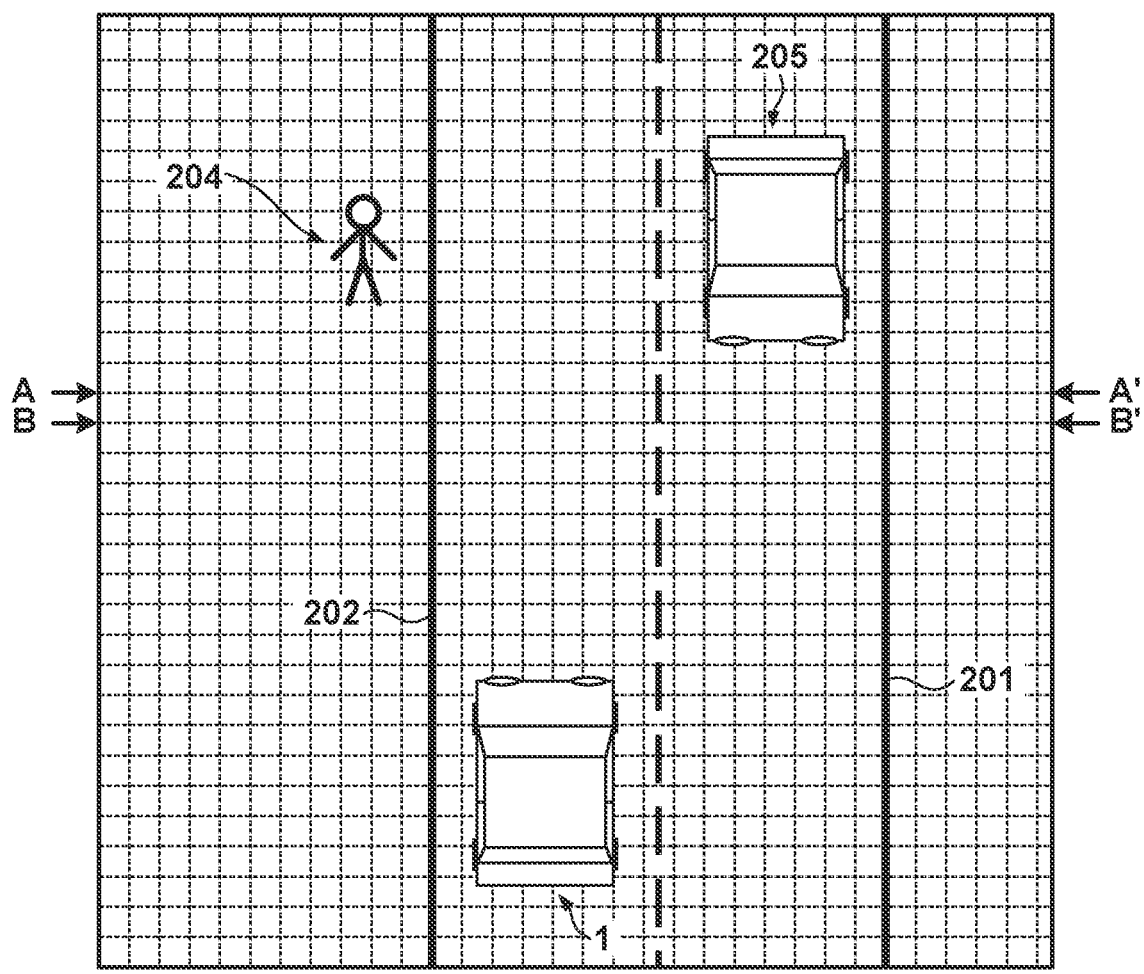
FIG. 3 is a diagram showing an example of positions for calculating values obtained based on travel data of a predetermined driver.

The second distribution is acquired by specifying values for multiple positions included in a certain range around the vehicle 1. For example, as shown in FIG. 3, straight lines in the forward direction and the direction perpendicular thereto are drawn at predetermined intervals in a certain range around the vehicle 1, and the above-described values are specified for each intersection of the straight lines. For example, values are specified for positions corresponding to pixels of an image such as that shown in FIG. 3 (i.e., the intersection points of the grid in FIG. 3 correspond to pixels), which shows information relating to the situation in the surrounding area of the vehicle 1 acquired from the ECUs 22 and 23. Note that FIG. 3 is merely an example, and for example, the above-described values may also be calculated for each intersecting point of multiple circular arcs centered about the vehicle 1 and straight lines drawn radiating from the vehicle 1.

Also, the second distribution is acquired in increments of a predetermined amount of time (e.g., 0.1 seconds) for a short period (e.g., 5 seconds). That is, for example, 50 two-dimensional distributions of values for intersection points of the grid in FIG. 3, which correspond to a 5-second period, are created every 0.1 seconds. At this time, for example, the vehicle 1 cannot move to regions right beside the vehicle 1 at at least the immediately-subsequent point in time (e.g., in 0.1 seconds), and such travel cannot be performed by any predetermined driver, and therefore the above-described values at those positions in these regions will definitely be 0. On the other hand, there is a possibility that the vehicle 1 will be present after the certain period (e.g., in 5 seconds) in a region right beside the vehicle at the current time in some cases due to the predetermined driver performing a reverse operation. For this reason, the above-described value at a position right beside the vehicle 1 after the certain period can be a value that is not 0. Also, in FIG. 3, in the forward direction of the vehicle 1, a pedestrian is present on the left side and another vehicle is present on the right side. For this reason, for example, if the predetermined driver on average drove toward the center line at a distance from a person, the above-described value at the position in the rightward direction increases. On the other hand, if the pedestrian and the other vehicle are far from each other, the above-described value at a position in the direction of moving forward as-is increases. In this manner, a second distribution obtained based on driving performed by a driving expert is specified at multiple points in time and multiple positions.

In one example, many pieces of travel data realized by a predetermined driver in many situations are acquired, and the second distribution is expressed as a distribution of actions actually taken by the predetermined driver in the current situation of the vehicle 1. That is, in travel performed by the predetermined driver in a situation that is completely or mostly the same as the current situation of the vehicle 1, the frequency with which the vehicle was present at each position or the probability that the vehicle was present at each position at each subsequent point in time is acquired as the second distribution. Accordingly, a second distribution is obtained in which a path actually traveled on by a large number of predetermined drivers has a higher value. This second distribution can be particularly useful in a case of driving along a road with few moving objects or the like, for example.

Also, machine learning, in which a combination of the data on the travel path of a vehicle acquired when a predetermined driver actually drove the vehicle and the data on the situation in the surrounding area of the vehicle detected at that time is used as the training data, can be executed, and the result of executing the machine learning can be used to acquire the second distribution. That is, the ECU 20 acquires the second distribution by calculating the above-described values at the positions using, as input, information relating to the situation in the surrounding area of the vehicle 1 acquired from the ECUs 22 and 23, based on the result of performing machine learning using the many pieces of training data acquired in advance from the predetermined driver. Note that a general-purpose algorithm can be used as the algorithm for machine learning, and there is no particular limitation thereto here.

Figure 4:
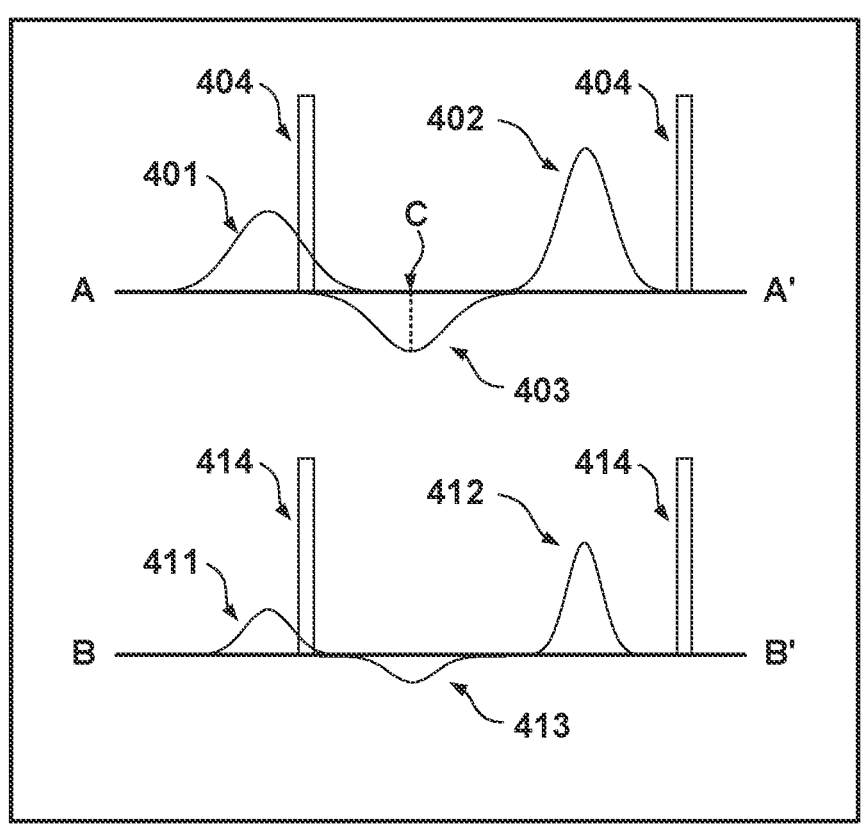
FIG. 4 is a diagram showing an example of relationships between distributions of values relating to objects and values obtained based on travel data of a predetermined driver, and a determined position of a vehicle.

Upon acquiring the second distribution, the ECU 20 calculates the values of the second distribution based on the values of the first distribution at the positions at each point in time, and specifies the positions at which the resulting values are at the minimum or are less than or equal to a predetermined value. FIG. 4 is a diagram showing first distributions and second distributions at positions from A to A' and B to B' in FIG. 3 at a certain point in time, for example. FIG. 4 shows the first distribution on the upper sides of the axes A to A' and B to B' and shows the second distribution on the lower sides of the axes A to A' and B to B'. That is, the first distribution and the second distribution, which has its positive and negative signs reversed, are shown in FIG. 4. In the first distribution, curved lines 401 and 411 are first distributions relating to the pedestrian 204 and curved lines 402 and 412 are first distributions relating to the other vehicle 205. Also, rectangular curved lines 404 and 414 are first distributions relating to still objects, such a curbstone (not shown). Since it is certain that the still object will stay put at its position without moving, a rectangular or mostly rectangular first distribution is formed which has a value that is high at that position and is zero or sufficiently small at other positions. In this manner, the still object and the moving object have first distributions with different edge shapes. For example, the curved lines 403 and 413 indicate second distributions obtained as a result of inputting information relating to the situation in the surrounding area of the vehicle 1 acquired from the ECUs 22 and 23 as arguments into a formula obtained as a result of completing machine learning. The ECU 20 adds the values of the curves 401 to 404 at the positions on the A to A' axis and adds the values of the curves 411 to 414 at the positions on the B to B' axis. Also, the ECU 20 can calculate similar values at positions outside of the A to A' and B to B' axes. In this manner, the ECU 20 calculates values obtained by subtracting the values of the second distributions from the values of the first distributions at each position, and selects the position at which the result is at the minimum (or a position at which the result is less than or equal to a threshold value, depending on the case). In the example shown in FIG. 4, the ECU 20 selects a position C as an example.

Figure 5:
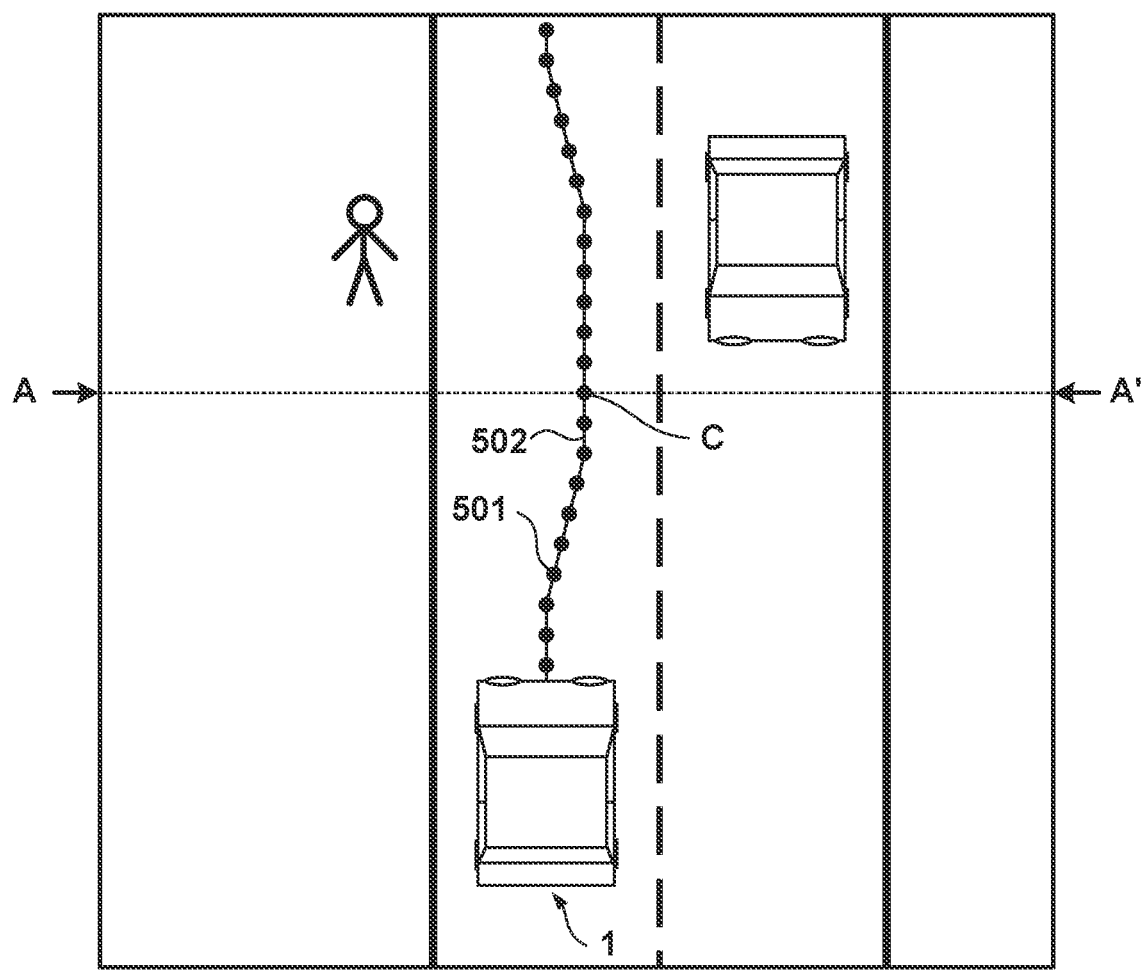
FIG. 5 is a diagram showing an example of a determined path.

The ECU 20 executes the same calculation at multiple points in time and determines a path that connects the positions selected for the points in time in chronological order. An example of this is shown in FIG. 5. At FIG. 5, a points 501 plotted in the travel direction of the vehicle 1 indicate positions at which the vehicle 1 is to be arranged, the positions being determined based on the first distribution and the second distribution as described above for multiple points in time. The position C determined in the same manner as in FIG. 4, for example, is included among the points 501. Note that the points 501 of FIG. 5 are plotted in chronological order and are higher up the farther forward in time they are. By specifying these points 501, the ECU 20 determines the path on which the vehicle 1 is to travel as a line 502 that connects these points 501.

Figure 6:
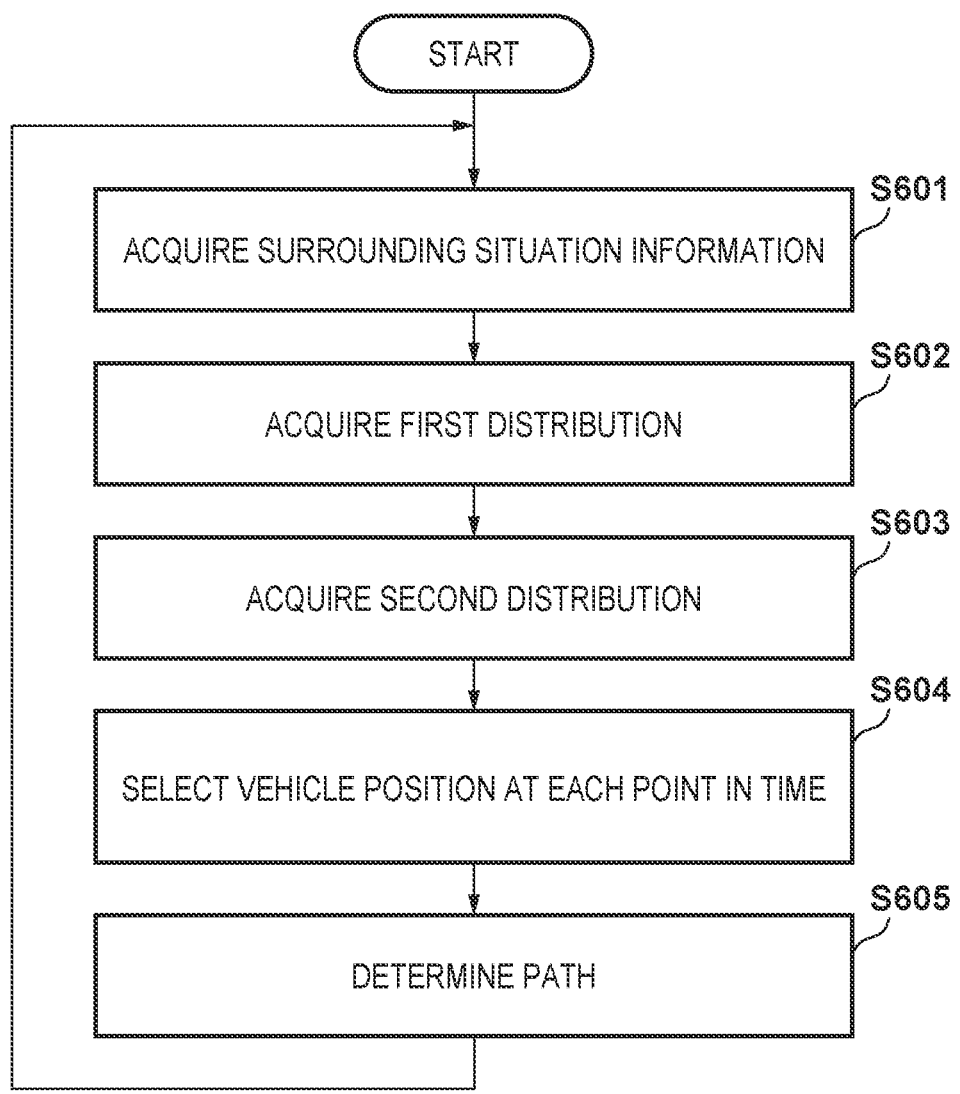
FIG. 6 is a flowchart showing an example of a flow of processing.

The above-described processing will be summarized in an overview of the flow of processing. FIG. 6 is a flowchart indicating a flow of the above-described processing. When the present processing is started, first, the ECU 20 acquires information relating to the situation in the surrounding area from the ECU 22 and 23 (step S601). At this point in time, for example, the ECU 20 acquires an image of the vehicle 1 and the situation in the surrounding area viewed from above, in which objects around the vehicle 1 are mapped. Then, based on the acquired information, the ECU 20 acquires, for multiple positions (e.g., for each pixel in the above-described images), a first distribution corresponding to the probabilities that the objects in the surrounding area will be present at a future time (step S602). Also, the ECU 20 acquires a second distribution by, for example, inputting the acquired information into an equation obtained through machine learning based on the travel data of a predetermined driver and the situation in the surrounding area of the vehicle at the time at which the data was acquired (step S603). The second distribution can be a distribution in which positions to which the vehicle is more likely to move when the predetermined driver is in the situation in the surrounding area indicated by the information acquired in step S601 have higher values. However, it should be noted that the results of the machine learning are values obtained by inputting information indicating the situation in the surrounding area into a formula and are not necessarily calculated as probability values. Note that steps S602 and S603 may also be performed in parallel and the order in which they are performed may also be reversed. Thereafter, the ECU 20 selects the positions to which the vehicle 1 is to move at multiple points in time based on the first distribution and the second distribution acquired with respect to the multiple points in time (step S604). Then, the ECU 20 determines the route path along which the vehicle 1 travels by connecting, in chronological order, the positions to which the vehicle 1 is to move, which were selected for the multiple points in time (step S605). The ECU 20 repeatedly executes these series of processes and causes the vehicle 1 to travel while sequentially updating the routepath.

Accordingly, the route path is determined with consideration given not only to the positions at which it is envisioned that the object will be present, but also to the accumulation of travel data of a predetermined driver, and therefore the probability that the path for a certain period can be determined increases. Also, this makes it possible to reduce the probability that the automated driving can no longer be continued, even in an environment in which there are many moving objects, such as an urban area. Furthermore, since the route path is determined based on actions actually taken by a predetermined driver, the vehicle 1 takes actions that the predetermined driver would have taken, or actions similar thereto, with reference to the surrounding environment. As a result, natural travel corresponding to the motion of traffic participants such as pedestrians and other vehicles is performed.

Note that the ECU 20 can repeatedly acquire information relating to the situation in the surrounding area of the vehicle 1 from the ECUs 22 and 23 in short cycles, such as every 0.1 seconds, for example, and can repeatedly determine the above-described route path based on the acquired information. This makes it possible to adjust the route path according to changes in the situation.

Also, the ECU 20 may limit the calculation of the values relating to the second distributions to the road surface that is the region through which the vehicle 1 can pass. That is, the second distribution may be calculated for all intersection points in the grid of FIG. 3, but values relating to the second distribution may also be calculated only for intersection points included in the region between the lines 202 and 203. Note that the ECU 20 can perform calculation of values relating to the second distribution for only the target travel route. For example, if the target travel route is straight at an intersection, values relating to the second distribution need not be calculated for the regions through which the vehicle 1 passes only when performing a left or right turn. Also, the ECU 20 may further limit the range in which the values relating to the second distribution are to be calculated based on the speed and travel direction of the vehicle 1 at that point in time. For example, the values relating to the second distribution need not be calculated for the regions right beside the vehicle 1, for regions that are in the travel direction but are too far away to be reached due to the relationship between the speed and the elapsed time, and the like. This is because even if these values are calculated, the probability that the route path will be set there is zero or very low. This makes it possible to reduce the complexity of processing since the number of instances of calculation relating to the second distribution can be significantly suppressed.

Note that, for example, the first distribution of a still object may be a distribution that does not suddenly become zero when the position at which the object is actually present is exceeded as viewed from the non-road side, but in which there is an edge that gradually decreases to zero in a predetermined range on the road side. Also, the first distribution of the still object may be a rectangular distribution that has a high value from the position at which the object is actually present as viewed from the non-road side to a range on the far side by a certain distance on the road side, and thereafter rapidly becomes zero. Thus, by designing the first distribution so as to have a non-zero value at the region past the position at which the still object actually exists, it is possible to prevent the vehicle 1 from coming too close to the still object.

For example, the second distribution can be specified using a model corresponding to the situations corresponding to cases such as the vehicle 1 being present on a straight road, the vehicle 1 entering an intersection, and the vehicle 1 approaching a junction or a fork in the road, for example. That is, a predetermined driver pays appropriate attention when driving the vehicle, but points to be paid attention to generally differ for each scene. For this reason, a second distribution that enables the vehicle 1 to travel suitably can be specified by updating the model for each scene. Note that, for example, multiple models are formed for an intersection model as well, such as an intersection straight-movement model, an intersection right-turn model, and an intersection left-turn model. For example, if the second distribution is specified using machine learning, learning is performed based on the travel data of a predetermined driver in various situations and on the data on the situation in the surrounding area during travelling, but this learning is performed for each model. The ECU 20 specifies the model that the vehicle 1 is to follow at that time based on the current position of the vehicle 1 and on the guide route searched for by the ECU 24, for example. Then, the ECU 20 can input information relating to the situation in the surrounding area of the vehicle 1 acquired from the ECUs 22 and 23 into a formula obtained through machine learning corresponding to the model, and thus can determine a second distribution corresponding to the model.

Furthermore, for example, the second distribution can be weighted such that a value the size of its peak does not exceed the value of the peak of the first distribution. Furthermore, the second distribution can be adjusted such that a first distribution relating to an object in the surrounding area is paid more attention than the second distribution obtained based on the travel data of the predetermined driver. For example, the values of the second distribution can be normalized with reference to the maximum value of values that are possible in the first distribution, such that the maximum value of the second distribution does not exceed the maximum value of the first distribution. For example, if the maximum value of the values that are possible in the first distribution is 1, the values of the second distribution can be scaled such that the maximum value of the values that are possible in the second distribution is 0.5 or the like. According to this, it is possible to give priority to avoiding interference with objects in the surrounding area of the vehicle 1 and to prevent the vehicle 1 from being present in a region in which there is a high probability that an object in the surrounding area is present, according to the travel data for the predetermined driver.

Also, although it was described that the second distribution is specified based on the travel data of a predetermined driver, the "predetermined drivers" in this context may also be sorted into multiple categories. For example, categories of predetermined drivers such as drivers who tend to arrive quickly at their destinations, drivers who tend to perform fuel-efficient travel, drivers who are good at sports driving, and drivers who are good at driving in urban areas may be provided. Also, different second distributions may be selectable for each category. This can be realized by, for example, categorizing the travel data collected for each predetermined driver, and for example, preparing multiple formulas by performing machine learning based on the collected travel data. Then, for example, a passenger of the vehicle 1 inputs the driving he or she desires via an input apparatus 9 of the vehicle 1, the ECU 20 selects the category of the predetermined driver according to the input, and the ECU 20 can determine the second distribution corresponding to the selection result. Accordingly, it is possible to realize automated driving that takes into consideration the preference of the passenger of the vehicle 1.

Note that in the above description, the terms "first distribution" and "second distribution" have been used, but since "first values" and "second values" that are specified at the positions are substantively used when specifying the travel routepath, a "distribution" does not necessarily need to be specified.

SUMMARY OF EMBODIMENTS

1. A vehicle control apparatus of the above-described embodiment is a vehicle control apparatus configured to control automated driving of a vehicle, characterized by being configured to in that:

acquire information relating to a situation in a surrounding area of the vehicle is acquired, acquire, for each of a plurality of positions, a first value relating to a probability that an object that is present in the surrounding area will be present at a future point in time and a second value obtained based on travel data of a predetermined driver are acquired based on the information, and determine a path on which the vehicle is to move is determined, by selecting positions at which the vehicle is to be present at a plurality of future points in time from the plurality of positions based on combinations of the first values and the second values.

According to this embodiment, by controlling the travel direction of the vehicle based not only on information relating to the range in which the object in the surrounding area can be present, but also on the travel data (travel history) of the predetermined driver, it is possible to cause the vehicle to travel with a feeling more similar to that of a person driving. Also, even if many objects are present in the surrounding area, a suitable path can be set based on the travel data of the predetermined driver.

2. The vehicle control apparatus of the above-described embodiment is wherein the vehicle control apparatus acquires the first values for the plurality of positions are acquired for each object that is present in the surrounding area, and the vehicle control apparatus determines the path is determined based on a combination of values obtained by adding together the first values for each position, and the second values.

According to this embodiment, first values serving as the overall situation can be suitably evaluated by acquiring first values separately for each of one or more objects that are present in the surrounding area. Also, it is possible to reduce the probability that the vehicle will interfere with one of these objects.

3. The vehicle control apparatus of the above-described embodiment is wherein a shape of an edge of a distribution of the first values is different according to whether the object that is present in the surrounding area is a moving object or a still object.

According to this embodiment, a suitable first value can be acquired corresponding to the features of the objects that are present in the surrounding area.

4. The vehicle control apparatus of the above-described embodiment is wherein the vehicle control apparatus acquires the second values are acquired by inputting the information into a formula obtained by performing machine learning using, as training data, a combination of data on a travel path of the vehicle obtained when a predetermined driver drove the vehicle, and data on the situation in the surrounding area of the vehicle, the situation being detected when the predetermined driver drove the vehicle.

According to this embodiment, even in a situation that the predetermined driver was never in, the second value can be acquired using the result of machine learning in various situations obtained from the past travel data.

5. The vehicle control apparatus of the above-described embodiment is wherein the second values are not acquired for a range through which the vehicle cannot pass.

According to this embodiment, the second values are no longer needlessly acquired for a region through which the vehicle will not travel, and processing for acquisition of these needless values is not performed, and thus the processing load of the vehicle control apparatus can be reduced.

6. The vehicle control apparatus of the above-described embodiment is wherein the second values are not acquired for a region off of a target travel route by which the vehicle travels to a destination.

According to this embodiment, the second values are no longer needlessly acquired for regions in directions that the vehicle is not to travel, and processing for acquisition of these needless values is not performed, and thus the processing load of the vehicle control apparatus can be reduced.

7. The vehicle control apparatus of the above-described embodiment is wherein the second values are not acquired for a region that cannot be reached by the vehicle based on at least one of the speed and the travel direction of the vehicle.

According to this embodiment, the second value is no longer needlessly acquired for regions that the vehicle cannot physically reach, and the processing for acquisition of these needless values is not performed, and thus the processing load of the vehicle control apparatus can be reduced.

8. The vehicle control apparatus of the above-described embodiment is wherein the vehicle control apparatus acquires the second values are acquired using different models based on a scene through which the vehicle travels.

According to this embodiment, automated driving can be suitably performed in each scene in which there is a possibility of making a different judgement even if the situations are similar, such as a straight road or an intersection.

9. The vehicle control apparatus of the above-described embodiment is wherein the first value is a value that is higher the higher the probability that an object that is present in the surrounding area will be present is, the second value is a value that is higher the higher the probability that the vehicle would be moved to each of the plurality of positions if a predetermined driver was in the situation is, and the vehicle control apparatus determines the path by selecting, from the plurality of positions, positions at which the size of a value obtained by subtracting the second value from the first value reaches a minimum or is less than or equal to a predetermined threshold value.

According to this embodiment, a path on which the vehicle is to move can be determined at positions at which there is a high probability that there are no objects in the surrounding area and that the predetermined driver would move the vehicle.

10. The vehicle control apparatus of the above-described embodiment is wherein the second values are normalized such that the maximum value of the second values does not exceed the maximum value of the first values.

According to this embodiment, even if there is a high probability that the predetermined driver would move the vehicle to a position at which there is a high possibility that an object in the surrounding area exists, it is possible to prevent a path of moving the vehicle to that position from being selected. Accordingly, it is possible to reduce the probability that the vehicle will interfere with the object.

11. The vehicle control apparatus of the above-described embodiment is wherein the vehicle control apparatus determines the path is determined for a period that is determined based on at least one of a range in which the vehicle can detect a situation in the surrounding area and an amount of time needed to brake the vehicle.

According to this embodiment, due to the path being determined exceeding the range in which the vehicle cannot detect the situation in the surrounding area, it is possible to prevent control from becoming unstable due to the path being determined exceeding the range in which the vehicle cannot detect the situation in the surrounding area, or by determining the path in a range in which the vehicle can be stopped, stable operation of automated driving can be made possible.

12. A vehicle of the above-described embodiment includes the above-described vehicle control apparatus.

This makes it possible to execute appropriate control in real time by rapidly executing the above-described processing inside of the vehicle.

13. A method of the above-described embodiment is a method to be executed by a vehicle control apparatus in order to control automated driving of a vehicle, the method being characterized by including:

acquiring information relating to a situation in a surrounding area of the vehicle;

acquiring, for each of a plurality of positions, a first value relating to a probability that an object that is present in the surrounding area will be present at a future point in time and a second value obtained based on travel data of a predetermined driver, the first value and the second value being acquired based on the information, and determining a path on which the vehicle is to move by selecting positions at which the vehicle is to be present at a plurality of future points in time from the plurality of positions based on combinations of the first values and the second values.

According to this embodiment, by controlling the travel direction of the vehicle based not only on information relating to the range in which the object in the surrounding area can be present, but also on the travel data (travel history) of the predetermined driver, it is possible to cause the vehicle to travel with a feeling more similar to that of a person driving. Also, even if many objects are present in the surrounding area, a suitable path can be set based on the travel data of the predetermined driver.

According to the present invention, a suitable path can be determined according to a situation, in an automated driving vehicle.

The present invention is not limited to the above embodiment, and may be changed and modified in various ways without departing from the spirit and the scope of the present invention. Therefore, to apprise the public of the scope of the present invention, the following claims are made.

What is claimed is:

1. A vehicle control apparatus configured to control automated driving of a vehicle, wherein the vehicle control apparatus is configured to:

acquire information relating to a situation in a surrounding area of the vehicle, acquire, for each of a plurality of positions, a first value relating to a probability that an object that is present in the surrounding area will be present at a future point in time and a second value obtained based on travel data of a predetermined driver based on the information, wherein the first value is acquired from a two-dimensional normal distribution or a rectangular distribution that represents, depending upon the object, a presence probability or a presence range of the object, wherein when the first value is higher, the probability that an object that is present in the surrounding area will be present is correspondingly higher, and wherein when the second value is higher, the probability that the vehicle would be moved to each of the plurality of positions if a predetermined driver was in the situation is correspondingly higher, and determine a path on which the vehicle is to move, by selecting positions at which the vehicle is to be present at a plurality of future points in time from the plurality of positions based on combinations of the first values and the second values, by selecting, from the plurality of positions, positions at which a value obtained by subtracting the second value from the first value reaches a minimum or is less than or equal to a predetermined threshold value, wherein the second values are normalized such that the maximum value of the second values does not exceed the maximum value of the first values.

2. The vehicle control apparatus according to claim 1, wherein the vehicle control apparatus acquires the first values for the plurality of positions for each object that is present in the surrounding area, and the vehicle control apparatus determines the path based on a combination of values obtained by adding together the first values for each position, and the second values.

3. The vehicle control apparatus according to claim 1, wherein a shape of an edge of a distribution of the first values is different according to whether the object that is present in the surrounding area is a moving object or a still object.

4. The vehicle control apparatus according to claim 1, wherein the vehicle control apparatus acquires the second values by inputting the information into a formula obtained by performing machine learning using, as training data, a combination of data on a travel path of the vehicle obtained when a predetermined driver drove the vehicle, and data on the situation in the surrounding area of the vehicle, the situation being detected when the predetermined driver drove the vehicle.

5. The vehicle control apparatus according to claim 1, wherein the second values are not acquired for a range through which the vehicle cannot pass.

6. The vehicle control apparatus according to claim 1, wherein the second values are not acquired for a region off of a target travel route by which the vehicle travels to a destination.

7. The vehicle control apparatus according to claim 1, wherein the second values are not acquired for a region that cannot be reached by the vehicle based on at least one of the speed and the travel direction of the vehicle.

8. The vehicle control apparatus according to claim 1, wherein the vehicle control apparatus acquires the second values using different models based on a scene through which the vehicle travels.

9. The vehicle control apparatus according to claim 1, wherein the vehicle control apparatus determines the path for a period that is determined based on at least one of a range in which the vehicle can detect a situation in the surrounding area and an amount of time needed to brake the vehicle.

10. A vehicle control apparatus configured to control automated driving of a vehicle, the vehicle control apparatus being configured to:

acquire information relating to a situation in a surrounding area of the vehicle, acquire, for each of a plurality of positions, a first value relating to a probability that an object that is present in the surrounding area will be present at a future point in time and a second value obtained based on travel data of a predetermined driver based on the information, wherein the second values are normalized such that the maximum value of the second values does not exceed the maximum value of the first values, and determine a path on which the vehicle is to move, by selecting positions at which the vehicle is to be present at a plurality of future points in time from the plurality of positions based on combinations of the first values and the second values.

\* \* \* \* \*